United States Patent [19]
Durant

[11] Patent Number: 4,597,510
[45] Date of Patent: Jul. 1, 1986

[54] IMPELLER PACKING MACHINE WITH PRE-CONDITIONING HOPPER

[75] Inventor: Will G. Durant, Tustin, Calif.

[73] Assignee: Westmont, Inc., Santa Fe Springs, Calif.

[21] Appl. No.: 585,944

[22] Filed: Mar. 2, 1984

Related U.S. Application Data

[63] Continuation-in-part of Ser. No. 371,750, Apr. 26, 1982, abandoned.

[51] Int. Cl.$^4$ .................. B65G 69/06; B65G 33/26; B65G 53/08; G01F 11/20
[52] U.S. Cl. ..................... 222/195; 222/239; 222/273; 222/412; 198/669; 406/55
[58] Field of Search ............ 222/252, 265, 271, 273, 222/410, 412, 226, 227, 236, 239, 241, 240, 195; 198/669, 548; 406/55, 59

[56] References Cited

U.S. PATENT DOCUMENTS

| | | | |
|---|---|---|---|
| 2,181,205 | 11/1939 | Rigor | 222/252 X |
| 2,978,097 | 4/1961 | Blanshine | 198/669 X |
| 3,679,271 | 7/1972 | Clark et al. | 222/195 X |

FOREIGN PATENT DOCUMENTS

| | | | |
|---|---|---|---|
| 216228 | 6/1956 | Australia | 406/59 |
| 487836 | 11/1952 | Canada | 222/227 |
| 652560 | 11/1962 | Canada | 198/669 |

Primary Examiner—Joseph J. Rolla
Assistant Examiner—Gregory L. Huson
Attorney, Agent, or Firm—Leonard Tachner

[57] ABSTRACT

An improved feed screw impeller apparatus primarily for use in an impeller bag packing system that is especially suited for filling bags with finely divided and aerated powders. The apparatus comprises an elongated cylindrical shaft having impeller blades extending radially therefrom at about the midpoint thereof and a plurality of feed screw flights of generally helical configuration, at least two such flights connected to said shaft on each side of the impeller blades in substantial coaxial alignment with the shaft. In one alternative embodiment of the invention there are four impeller blades and four helical feed screw flights, two on each side of the impeller blades and each terminating along an edge extending in substantial alignment with a different impeller blade. Another version of the novel impeller is employed in a packing machine also having a novel pre-conditioning hopper. The hopper comprises a fluidization chamber, the bottom of which is sealed by a dissemination pad which permits low pressure air to be percolated upwardly through the powder product. Continuous air percolation during bag filling combined with the disclosed impeller assures rapid rates of product flow enabling the user to obtain high weight accuracy, short fill times and a compactly filled bag. This version of the impeller is shown utilizing feed screw flights on only one side of the impeller, however either impeller embodiment may be combined with the pre-conditioning hopper.

3 Claims, 5 Drawing Figures

DIRECTION OF ROTATION

IMPELLER PACKING MACHINE WITH PRE-CONDITIONING HOPPER

BACKGROUND OF THE INVENTION

This application is a continuation-in-part of patent application Ser. No. 371,750 filed Apr. 26, 1982, now abandoned.

FIELD OF THE INVENTION

This invention relates generally to apparatus especially suitable for automaticlly filling valve bags and more particularly, to an improved impeller and pre-conditioning hopper particularly adapted for a bag packing apparatus for the packaging of finely divided and aerated powders.

PRIOR ART

Multi-wall bag packaging of finely divided and aerated powders, particularly those with particle sizes in the micron range, has in the past, been a difficult and time consuming problem not readily solved with conventional bag packing equipment such as air pressure packers and ordinary feed screw packers. This problem has been solved in part by an impeller packer manufactured and sold by the St. Regis Paper Company in the form of a jet flow impeller packer which utilizes a feed screw impeller system comprising a plurality of impeller blades radiating from a shaft and having oppositely facing feed screw flights positioned on the shaft and axially displaced from the impeller blades. The flights compact or densify the finely divided powder or other similar medium as it is delivered to the impeller blades. Then the blades forcefully eject the powder or similar medium through a feed tube into the bag being filled. The manufacturer of this prior art impeller packing device claims as an example, that one product required up to two minutes to pack using a conventional air packer, required only 14 seconds to pack a fifty pound bag utilizing their equipment.

Unfortunately, even with the vast improvement claimed by the manufacturer of the prior art impeller packer, the impeller design utilized in such a prior art device still leaves much to be desired in terms of the time it takes to fill a bag with such media as aerated powder and the like. With 14 seconds to fill a fifty pound bag, less than five bags can be packed each minute. The present invention comprises an improved feed screw impeller apparatus which substantially increases the number of bags that can be packed in any given period of time by means of a unique feed screw impeller configuration that substantially increases the efficiency with which the packing media is delivered to the impeller blades. More specifically, it will be seen hereinafter that the present invention provides this highly improved operating efficiency by doubling the number of feed screw flights on each side of the impeller blades and by changing the orientation of the feed screw flights so that each one of the four flights terminates adjacent a different one of the impeller blades.

The only relevant prior art known to the applicant in addition to the previously mentioned St. Regis machine is disclosed in U.S. Pat. No. 3,889,853 to Ribouleau. Ribouleau discloses a distributing apparatus for agricultural purposes which utilizes an impeller blade feed screw combination. However just like the St. Regis device, the Ribouleau device utilizes only one flight on each side of the impeller and apparently each such flight terminates at the same place in rotation with respect to the impeller blades. The improved configuration of the present invention so significantly increases the efficiency of filling a bag with a finely divided or aerated powder that the filling can be accomplished in about fifty to eighty percent of the amount of time necessary to fill a bag using the most advanced prior art impeller feed screw combinations known to the applicant.

The powder products upon which the impeller of the present invention is designed to operate, are typically very finely ground and therefore tend to release air easily. Consequently, such products tend to become compacted to an extent which hinders their flow into bags despite the use of the novel impellers disclosed herein or the less efficient impellers of the prior art. The compacting problem may be overcome by percolating air through a porous dissemination pad through the product before it is fed into the bag to be filled. However, applicant knows of no prior art apparatus which is capable of intentionally fluidizing the product with air through a porous dissemination pad nor which is capable of percolating air through the media in the manner herein disclosed.

SUMMARY OF THE INVENTION

The present invention comprises an improved impeller feed screw apparatus in which each of the usual symmetrically located radial impeller blades has one feed screw flight associated with it. In one embodiment of the impeller there are four such feed screws affixed to the shaft from which the impeller blades extend, two on each side of the impelller. Each two feed screws begin and terminate at points spaced 180 degrees around the periphery of the shaft adjacent to radially disposed impeller blades. In addition, the feed screw flights on one side of the impeller blades along the shaft are in quadrature relation with the feed screw flights on the other side of the impeller blades along the shaft whereby the starting and ending points of the four feed screw flights are spaced in quadrature relation respectively around the periphery of the shaft to which the impeller blades are connected and each flight ends adjacent a different impeller blade. Thereby, in addition to increasing the delivery volume of the media to the impeller blades by increasing the number of feed screw flights, the efficiency of impeller blade performance is increased in the present invention by allowing the media delivered to the impeller blades by each flight to be predominantly affected by a different blade. A second embodiment of the impeller in which the blades are located at one end of the shaft, uses only two helical feed screws, both on the same side of the impeller blades and oriented in accordance with the invention at 180 degrees with respect to one another. Either impeller embodiment is particularly adapted for operation in combination with a novel pre-conditioning hopper which fluidizes the media by percolating air through it during bag filling. A dissemination pad, which seals the bottom of the hopper chamber, permits low pressure air to be admitted into the chamber and percolated through the product before delivery of the media to the bag by the impeller. The head of the material and the venting of the air are both controlled by the pre-conditioning hopper without subjecting the chamber to any stressful air pressure levels such as found in air packers which rely on air pressure to force the media into bags.

OBJECTS

It is therefore a principal object of the present invention to provide a novel feed screw impeller blade and air percolator apparatus for filling multi-wall bags with aerated powders and finely divided powders but which does so in a more efficient and highly advantageous manner as compared to known prior art.

It is another object of the present invention to provide an improved feed screw impeller air percolation apparatus primarily for use in bag packing of media including particle sizes in the micron range and which improves efficiency of the known prior art by providing at least two feed screw flights on one side of the impeller along the shaft to which the impeller blades are connected.

It is still an additional object of the present invention to provide a feed screw impeller and air percolator combination in an apparatus used for filling bags with particulate material and which employs a plurality of feed screws, one such feed screw flight corresponding to each impeller blade and each such feed screw flight terminating adjacent a different one such impeller blade for increasing the efficiency of delivery of particulate material to the impeller.

It is still an additional object of the present invention to provide a feed screw impeller apparatus for an impeller bag packer and which employs four feed screw flights, two on each side of an impeller along a common shaft, the flights all being in quadrature relation to one another to optimize the efficiency of media delivery to the impeller blades to substantially decrease the amount of time required to fill a bag with such particulate material.

It is still an additional object of the present invention to provide a highly efficient bag filling apparatus which utilizes a novel media pre-conditioning hopper which assures a fluidized powder product by percolating air through the product before it is delivered to the bag.

BRIEF DESCRIPTION OF THE DRAWINGS

The above-noted objects and advantages of the present invention as well as additional objects and advantages thereof will more fully understood hereinafter as a result of a detailed description of a preferred embodiment of the invention when taken in conjunction with the accompanying drawings in which.

DESCRIPTION OF A PREFERRED EMBODIMENT

Figure 1:
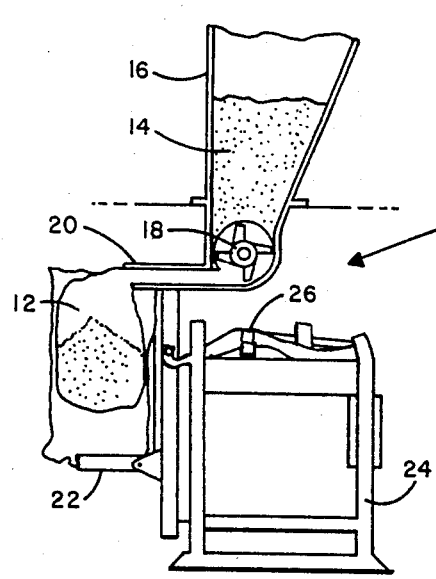
FIG. 1 is an illustrative plan view of a prior art bag packing apparatus in which feed screw impeller apparatus including those of the present invention may be utilized.

FIG. 1 is included herein to illustrate the apparatus in which the present invention, as well as prior art upon which the present invention is an improvement, may be utilized. More specifically, there is shown in FIG. 1 an impeller bag packing apparatus 10 commonly used for filling a multi-wall bag 12 with a fine powder medium 14. As further shown in FIG. 1, the fine powder medium 14 is contained within a typical hopper 16 which permits the fine powder medium to be gravity fed into the feed screw impeller apparatus 18 located at the lower-most portion of hopper 16. Feed screw impeller apparatus 18 propels the medium through a filling tube 20 to which the open end of bag 12 is connected for receiving the medium. Typically, the bag 12 sits on a bag chair 22 which forms part of a support structure 24 and is typically connected to a scale 26 allowing the user to either manually or automatically stop the bag filling process when a desired weight of medium has been propelled into the bag by the impeller feeder 18.

Figure 3:
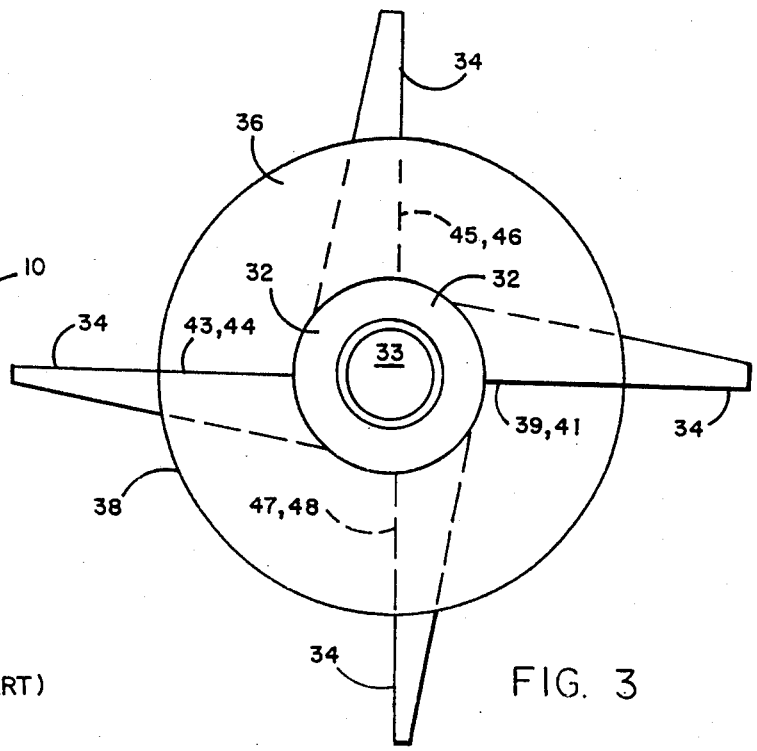
FIG. 3 is a side or axial view of the impeller embodiment of the present invention taken along lines 3—3 of FIG. 2.
Figure 2:
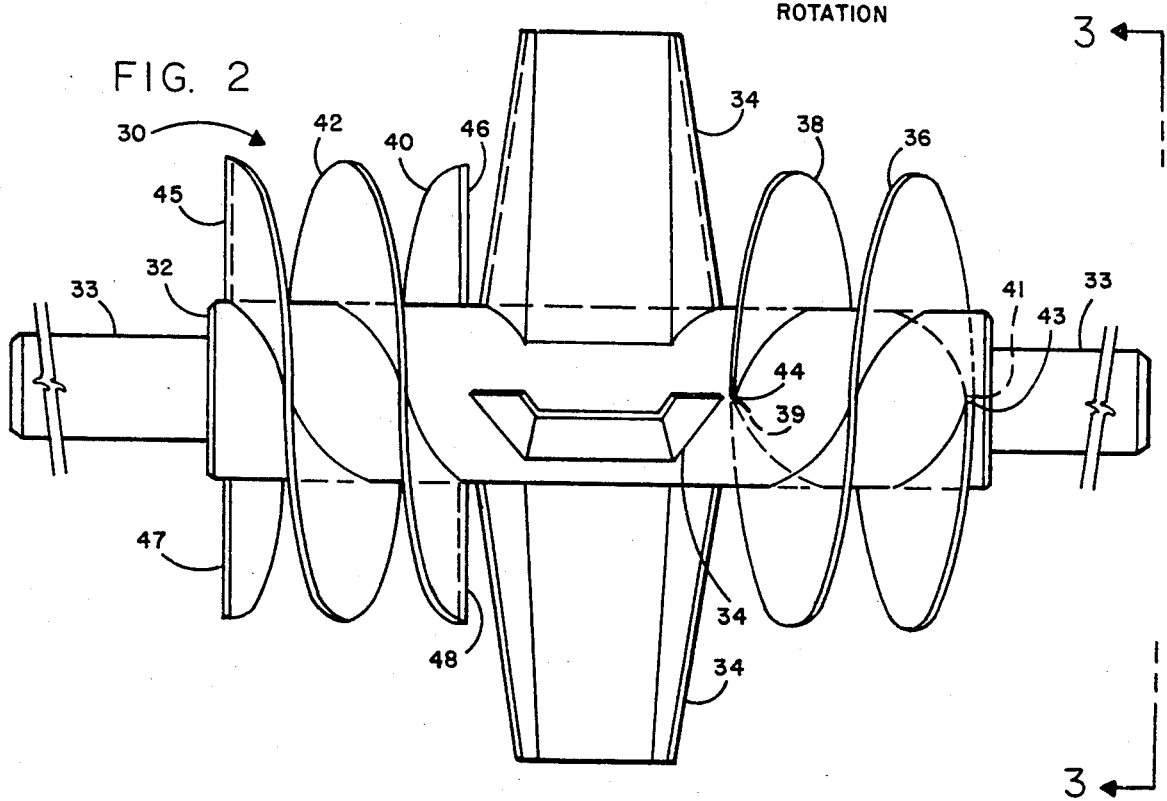
FIG. 2 is a front or radial view of one embodiment of the impeller of the present invention.

As shown in FIGS. 2 and 3 the improved feed screw impeller apparatus 30 of the present invention comprises a main shaft 32 and a pair of axially extending shaft members 33 of reduced diameter for facilitating connection of the feed screw impeller of the invention into the packing apparatus in a conventional manner. A plurality of impeller blades 34 are connected to the main shaft 32 at about the center thereof. In the preferred embodiment of the invention illustrated in FIGS. 1 and 2, there are four such impeller blades 34 spaced symmetrically about shaft 32 and extending radially outward therefrom. As seen in FIG. 2, a pair of right hand helical flights 36 and 38 are affixed to main shaft 32 to the right of impellers 34. Similarly, a pair of left hand flights 40 and 42 are affixed to main shaft 32 to the left of impeller blades 34.

For purposes of explanation, the terminating ends or edges of flights 36, 38, 40 and 42 that are closest to the impeller blades 34 are designated inner edges and the terminating ends or edges farthest from the impeller blades, are designated outer edges. As seen in FIG. 2, the outer edge 41 of flight 36 runs perpendicular to the plane of the figure on the opposite side of shaft 32 and the inner edge 39 runs perpendicular to the plane of the figure also on the opposite side of shaft 32 as seen in FIG. 2. Similarly, the outer edge 43 of flight 38 runs perpendicular to the plane of the figure on the viewable side of shaft 32 and the inner edge 44 of flight 38 runs perpendicular to the plane of the figure also on the viewable side of shaft 32 as seen in FIG. 2. Similarly, the outer edge 45 of flight 40 runs parallel to the plane of the figure on top of shaft 32 as seen in FIG. 2 and the inner edge 46 of flight 40 also runs parallel to the plane of the figure on top of the shaft 32. Finally, the outer edge 47 of flight 42 runs parallel to the plane of the figure at the bottom of shaft 32 and the inner edge 48 of flight 42 runs parallel to the figure on the bottom of shaft 32.

Accordingly, it will be seen that the inner and outer edges of each flight are located along a common radial line along shaft 32 and that each pair of flight edges is in quadrature relationship with respect to the corresponding pairs of flight edges of the remaining flights. Furthermore, it will be seen that each pair of flight edges is located radially along shaft 32 in substantial proximity to one and only one impeller blade 34. This novel feature of the invention can be readily observed in the view provided by FIG. 3 where it is seen that edges 39 and 41 of flight 36 are substantially aligned with one impeller blade 34, that edges 43 and 44 of flight 38 are substantially aligned with the oppositely facing impeller blade 34, that edges 45 and 46 of flight 40 are substantially aligned with the upwardly radiating impeller blade 34 as seen in FIG. 3 and that the edges 47 and 48 of flight 42 are substantially aligned with the oppositely facing impeller blade 34 as seen in FIG. 3. In addition, it will be seen that the respective pairs of flight edges are spaced symmetrically around the main shaft 32 at 90 degree intervals.

Figure 4:
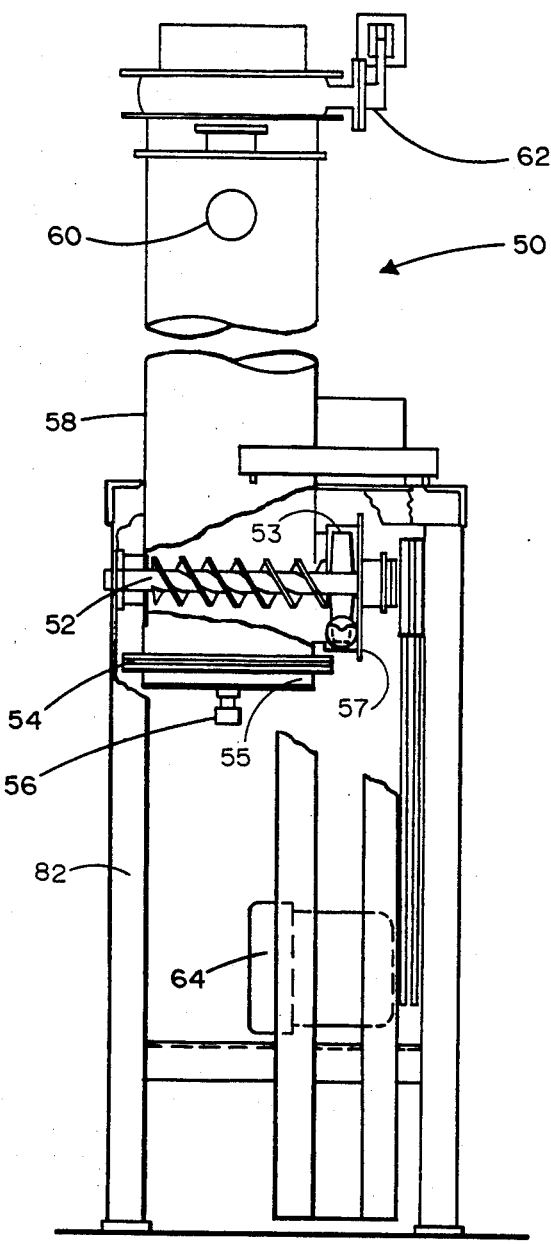
FIG. 4 is a front elevational view of a bag filling apparatus utilizing a second embodiment of the impeller of the present invention in combination with a media fluidization chamber.
Figure 5:
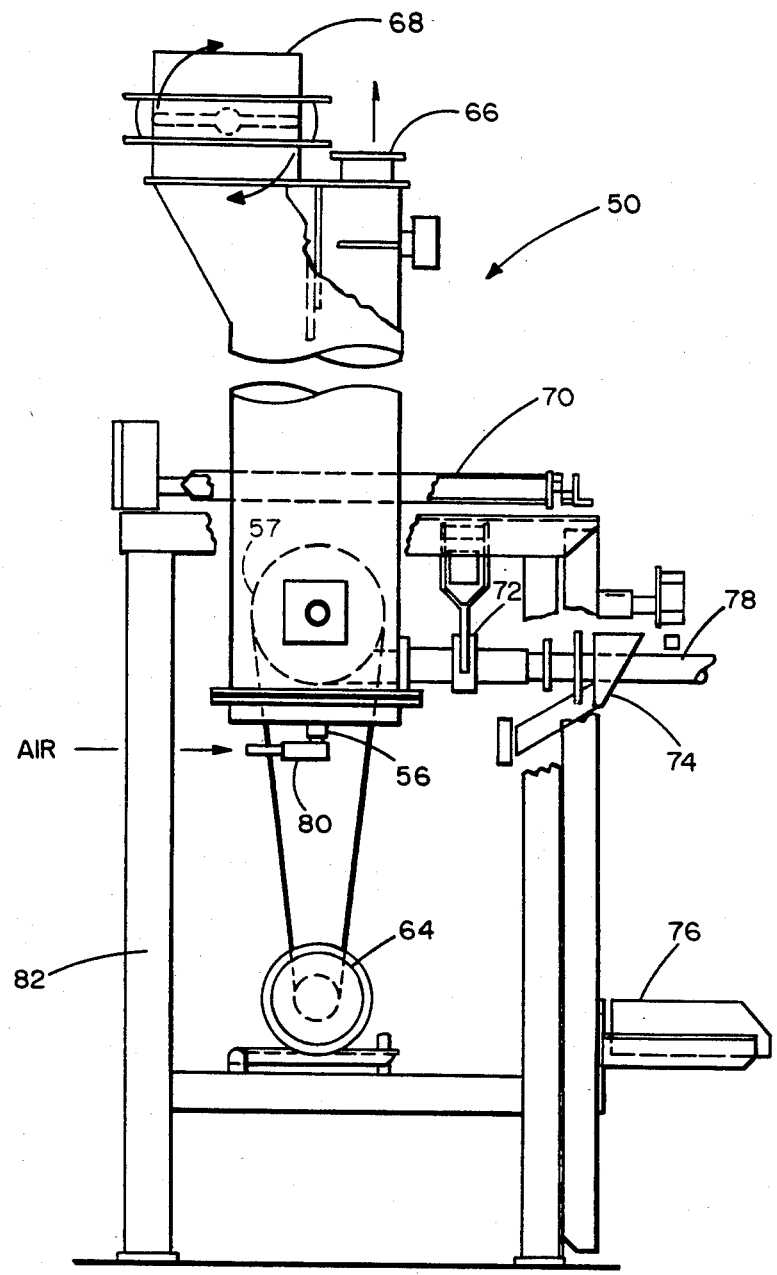
FIG. 5 is a side elevational view of the bag filling apparatus of FIG. 4.

A second embodiment of the impeller of the invention as well as a novel pre-conditioning hopper for which the invention is used are disclosed in FIGS. 4 and 5 to which reference will now be made. As seen in FIGS. 4 and 5, the present invention may be advantageously utilized in a combination comprising a pre-conditioning hopper 50 which acts synergistically with an alternative embodiment of the invention comprising a double helix, four vane impeller 52 having a plurality of impeller blades 53. It will be observed best in FIG. 4 that in this configuration the impeller of the present invention comprises impeller blades 53 which extend from the end of a shaft having a pair of dual helical flights extending on one side thereof. The impeller shaft resides in a fluidizing chamber 58, the bottom of which is sealed by a fluidizing pad 54 which is typically made of a porous material such as canvas and the like which will prevent passage of the powder product but permit passage of air. The fluidizing chamber 58 terminates immediately below the fluidizing pad 54. Between the pad 54 and the bottom of the chamber 58 there resides an air pocket 55 to which low pressure air access is obtained by means of a fluidizing control valve 56 at the very bottom of the chamber 58. As seen in FIG. 5, valve 56 is connected to an air hose 80 which permits the application of air under low pressure to be applied to the bottom of the chamber 58 through the air pocket 55 and fluidizing pad 54. Air introduced into the chamber 58 in this manner will percolate up through the product contained within the chamber 58 and eventually escape by means of an air vent 66 seen best in FIG. 5.

The combined pre-conditioning hopper and improved impeller combination of FIGS. 4 and 5 also comprises a product level control switch 60, a product inlet butterfly valve 62, an impeller drive motor 64, a product inlet 68, a mechanical beam or electromechanical scale 70, a pinch gate product flow cutoff valve 72, a dust collection system 74, a bag chair 76, a filling spout 78 and a structural support 82.

The apparatus disclosed in FIGS. 4 and 5 is designed to package various finely ground products which tend to give up air easily and would otherwise therefore become compacted and difficult to pack efficiently into a bag to be filled. However, in the present invention shown in FIGS. 4 and 5, the product is properly fluidized prior to entering the impeller and being driven into the bag. This fluidization process is provided by means of a fluidizing chamber 58 utilizing the flat dissemination pad 54. Low pressure air is admitted through this pad and is disseminated across the entire bottom surface of the chamber. Typically, product is first admitted through the product inlet 68. When the product reaches the level of the product level control switch 60, product inlet butterfly valve 62 closes thereby stopping further product from entering the fluidization chamber 58. With the chamber filled, air bleeding continuously through dissemination pad 54 and controlled by an air control valve 56 begins to percolate up through the product column bringing the product into a fluidized state. The air continually escapes in a controlled fashion through the product vent 66. When the machine is not running the product control valve 72 is closed thereby pinching the tube and preventing product from escaping out of the filling spout 78. When the machine is started the product control valve 72 opens and the motor 64 begins to operate, rotating the impeller 52 at the appropriate speed to drive the fluidized product out of the filling spout 78 and into the bag. Excessive dust is collected by a dust collection system 74 while the bag is properly supported on a scale platform by a bag support chair 76.

When the bag has been filled with the proper weight of product, the scale system 70 shuts off the filling machine and the product control valve 72 promptly closes preventing further product from entering the bag. The impeller drive motor 64 is plug reversed and brought to a stop. The product inlet valve 62 is opened, admitting a controlled amount of additional product into the fluidization chamber 58. The cycle then continues by repeating each of the operations just described as each bag is being filled.

The impeller 52 is comprised of a multiple helix feed screw feeding multiple rotary impeller blades 53. The impeller is contained within a casing 57 that protrudes to the side of the fluidization tank 58 and is supported by bearings in a well-known manner. A casing that extends from the center of the tank would be used in conjunction with the first impeller embodiment of FIG. 2. Air purge-type packing glands are employed bleeding a small amount of air into the chamber in order to prevent product from escaping at the packing gland areas. The impeller and pre-conditioning hopper combination as well as all of the ancilliary devices used for actually packing the bag are appropriately affixed to a structural support 82 as seen in FIGS. 4 and 5.

It will now be understood that what has been disclosed herein is an improved feed screw impeller apparatus primarily for use in an impeller bag packing system wherein the improvement comprises in one embodiment an impeller having a pair of parallel helical feed screw flights on each side of the shaft relative to the impeller blades wherein each such flight terminates adjacent a different one of a plurality of such blades. The invention thereby provides a plurality of separate paths for particle densification and travel toward the impeller blades and improved efficiency of impeller blade feed screw flight relationship to enable a substantial reduction in the time needed to fill a bag of any given weight of particulate material including by way of example, limestone products, magnesium silicate, clay products, boric acid, cement and a wide variety of other powdered chemical, earth mineral and food products.

Two embodiments of the impeller of the present invention have been disclosed herein. In one such embodiment, the impeller comprises a pair of helical feed screws on each side of centrally located impeller blades thereby providing four separate paths to the blades by the screw flights. In a second embodiment of the invention the impeller blades are located at the end of a shaft and one pair of parallel screw flights are located along the shaft leading up to the impeller blades. Both embodiments are especially adapted for operation in combination with a bag filling apparatus which comprises a novel pre-conditioning hopper which utilizes percolating low pressure air to fluidize the product prior to its introduction into the impeller. The pre-conditioning and constant fluidization of products prior to their entering the impeller device coupled with the efficient design of the impeller itself, enables such a machine to fill multi-wall valve bags with fine powder at a rapid rate with constant flow thus enabling the user to obtain good weight accuracy, fast fill times and a compact bag.

It will now also be understood that in view of applicant's teaching herein disclosed, various modifications and additions may be made to the present invention. For example, although applicant in a preferred embodiment herein disclosed, has taught a specific quadrature relationship in the radial direction of the impeller blades and flight edges, it will now also be obvious to those having skill in the art to which the present invention pertains, to choose a different relationship between those features of the invention depending on the number of flights and impeller blades and other factors which may influence the design of alternative configurations. As a further example, various alternative apparatus for percolating air into and through a product chamber by means of a porous dissemination pad will now also occur to those having relevant skill in the related art. However, it is to be understood that all such modifications and additions are deemed to be within the scope of the present invention which is to be limited only by the claims appended hereto.

I claim:

1. A bag filling apparatus of the type used for delivering particulate material to a filling spout to which a bag to be filled is attached; the apparatus comprising:
   a source of pressurized gas;
   a pre-conditioning hopper having a chamber for containing a selected volume of particulate material, said chamber having a bottom surface comprising a porous dissemination pad through which said source of pressurized gas can forcefully direct such gas upwardly into said chamber for aerating and preventing compaction of said particulate material thereby permitting said particulate material to flow more freely; and
   an impeller member having a longitudinally directed elongated cylindrical shaft to which a plurality of impeller blades are connected symmetrically along the wall of said shaft and from which extend radially helical feed screw flights, at least two such flights being in overlapping parallel relation to each other and each terminating adjacent, radially aligned, and longitudinally displaced from a different one of said impeller blades;
   said feed screw flights communicating with said chamber, said impeller blades communicating with said spout for feeding said aerated particulate material to each said bag.

2. The impeller apparatus recited in claim 1 wherein the number of impeller blades is equal to the number of said feed screw flights.

3. The impeller apparatus recited in claim 2 wherein there are an equal number of feed screw flights on each axial side of said impeller blades.

* * * * *